Sept. 26, 1967 E. E. MOYER ETAL 3,344,336
CIRCUIT FOR CONVERTING DIRECT CURRENT TO ALTERNATING CURRENT
HAVING A STABLE OUTPUT FREQUENCY AND VOLTAGE
Filed Dec. 6, 1963 10 Sheets-Sheet 1

ELMO EMERSON MOYER
CHARLES RICHARD BRANDOW
INVENTORS

BY George B. Oujevolk
ATTORNEY

ELMO EMERSON MOYER
CHARLES RICHARD BRANDOW
INVENTORS

BY George B. Oujevolk

ATTORNEY

ELMO EMERSON MOYER
CHARLES RICHARD BRANDOW
INVENTORS

BY George B. Oujevolk

ATTORNEY

ELMO EMERSON MOYER
CHARLES RICHARD BRANDOW
INVENTORS

BY George B. Oujevolk

ATTORNEY

ELMO EMERSON MOYER
CHARLES RICHARD BRANDOW
INVENTORS

BY George B. Oujevolk
ATTORNEY

ELMO EMERSON MOYER
CHARLES RICHARD BRANDOW
INVENTORS

BY George B. Oujevolk

ATTORNEY

ELMO EMERSON MOYER
CHARLES RICHARD BRANDOW
INVENTORS

BY George B. Oujevolk

ATTORNEY

ELMO EMERSON MOYER
CHARLES RICHARD BRANDOW
INVENTORS

BY George B. Oujevolk
ATTORNEY

ELMO EMERSON MOYER
CHARLES RICHARD BRANDOW
INVENTORS

BY George B. Oujevolk
ATTORNEY

ELMO EMERSON MOYER
CHARLES RICHARD BRANDOW
INVENTORS

BY George B. Oujevolk

ATTORNEY

United States Patent Office 3,344,336
Patented Sept. 26, 1967

3,344,336

CIRCUIT FOR CONVERTING DIRECT CURRENT TO ALTERNATING CURRENT HAVING A STABLE OUTPUT FREQUENCY AND VOLTAGE

Elmo Emerson Moyer, Saratoga Springs, and Charles Richard Brandow, Albany, N.Y., assignors to Espey Mfg. & Electronics Corp., Saratoga Springs, N.Y., a corporation of New York Filed Dec. 6, 1963, Ser. No. 328,639
16 Claims. (Cl. 321—18)

ABSTRACT OF THE DISCLOSURE

Transistorized circuits to produce regulated AC signal from a DC source using Zener diode and resistor combinations to set a constant reference voltage, and transistor or saturable core means to absorb DC voltage in excess of a predetermined constant value while also accomplishing the switching operations necessary for conversion from DC to AC signal.

The present invention relates to a circuit arrangement for converting power supplied from a direct current source into alternating current having a stable frequency and voltage and more particularly to a transistor circuit arrangement using a minimum of components, conveniently mounted on a circuit board useful in converting direct current to alternating current.

In a DC to AC converter, a push-pull type of configuration is usually employed. In this type of arrangement, a combination of reactive and resistive components, e.g., excitation winding, capacitors, resistors are so disposed that when a DC potential is applied to the system, one transistor starts to conduct building up a potential in the excitation component until the limit of the conducting transistor is reached. At this point, the potential of the excitation component must necessarily decrease until the potential in the excitation component is of the opposite polarity to that in the conducting transistor at its maximum. This potential excites the second transistor to conduct in opposed phase to the first transistor until the second transistor is at its maximum and the cycle is then repeated.

It is well known that the AC output voltage and frequency of a simple DC to AC conversion circuit varies in essentially direct proportion to the DC source voltage.

That the AC output voltage should vary in direct proportion to the DC source voltage is almost too obvious for further consideration since the AC is made from the DC by reversing the DC periodically and no means are assumed for absorbing any of the source voltage in the process. It may be a bit more difficult to understand why the AC frequency should vary in proportion to the DC source voltage, and, in practice, the constancy of frequency vs. $E_{DC}$ may not be as invariant as the ratio of $E_{AC}$ to $E_{DC}$. Generally, the measurement of, or generation of, frequency involves a time interval and this time interval must be obtained by the manipulation of some voltage or current source which is the DC supply and assumed to be somewhat variable. When time is measured by the voltage across the capacitance, in a series RC network, reaching a given level of voltage at the end of the desired time interval, this level of capacitance voltage is a percentage of the voltage applied to the circuit. Thus, even though R and C were constant in value, a given level of capacitance voltage would be reached in a variable time interval if the supply voltage varied. A similar result is obtained if series inductive resistive circuit is used and the time-interval voltage is derived from across the resistive element. However, the more commonly used measure of a timing interval is the volt-seconds area accumulated across an inductance between the limits of saturation in one direction of excitation current, i.e. polarity, and saturation in the opposite direction. This is an essentially constant quantity for a specific design of saturating iron-cored inductor, hence if the applied voltage is increased the time interval is decreased (i.e. frequency is increased) and vice versa.

In most applications, the DC supply voltage will vary, sometimes considerably, since, more often than not, it is an independent power source and not a utility network. Yet, irrespective of these supply voltage variations the user may want the output voltage and frequency to remain essentially constant at some specific design values. Thus, the problem of controlling output AC voltage of the converter is one of absorbing DC voltage in excess of a minimal value. If frequency is to be maintained constant along with the AC voltage then the AC voltage could be used to supply the frequency setting circuit. Although attempts may have been made to provide a simple transistor oscillator circuit for converting a DC input into an AC output of a fairly constant voltage and frequency, none of simple design, as far as we are aware, have ever been successful when carried out into practice on an industrial scale.

It has now been discovered that a transistor circuit arrangement can be provided to convert DC into AC of a constant output voltage and frequency using a minimum of components, and which can readily be mounted on a circuit board.

Thus, one object of the present invention is to provide a DC to AC conversion circuit.

Another object of the present invention is to provide a DC to AC conversion circuit, or oscillator of fairly constant frequency and voltage.

Still another object of the present invention is to provide such a circuit with a minimum of circuit components and in fact utlizing some components to perform a dual function, mountable on a circuit board with a plurality of possible connections.

Other objects and advantages will become apparent from the following description taken in conjunction with the accompanying drawing in which.

Figure 1:
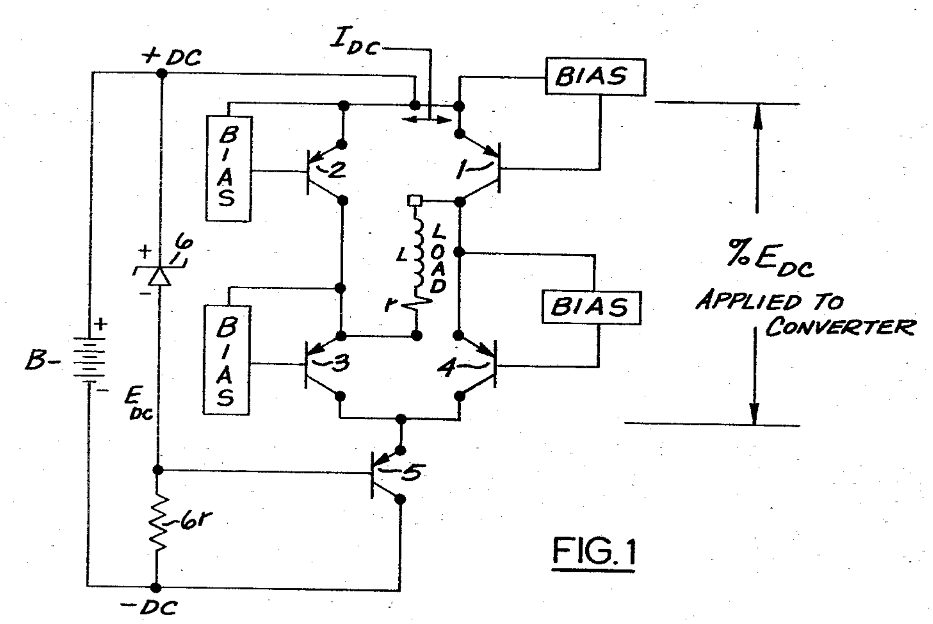
FIGURE 1 is an elementary explanation in schematic form of some features of the operational theory of the present invention.
Figure 2:
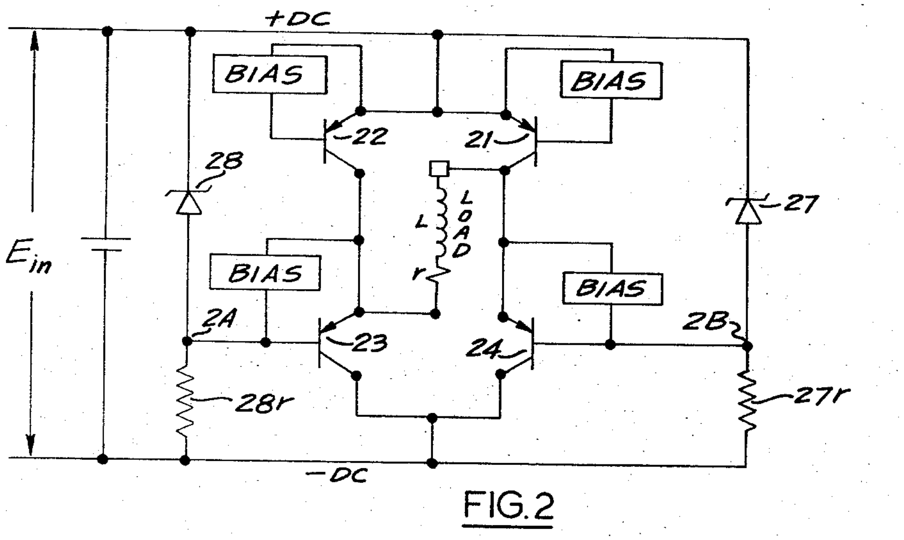
FIGURE 2 shows an elementary explanation in schematic form of other features of the operational theory of the present invention.
Figure 3:
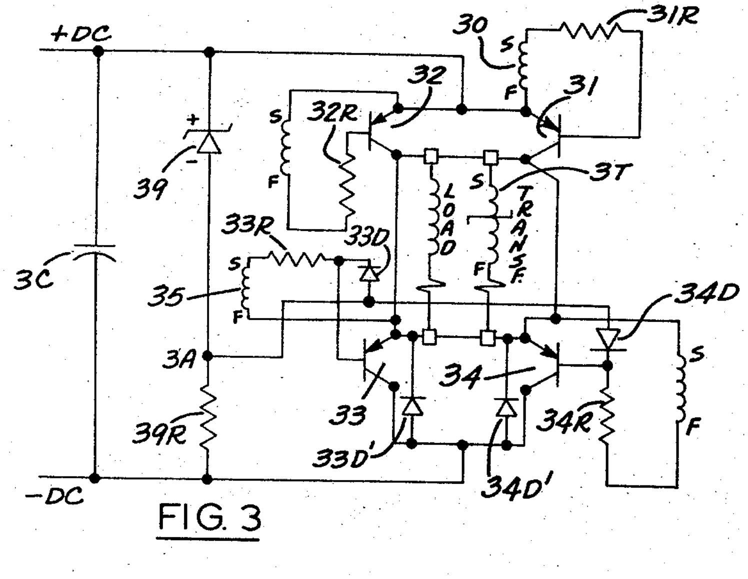
Figure 4:
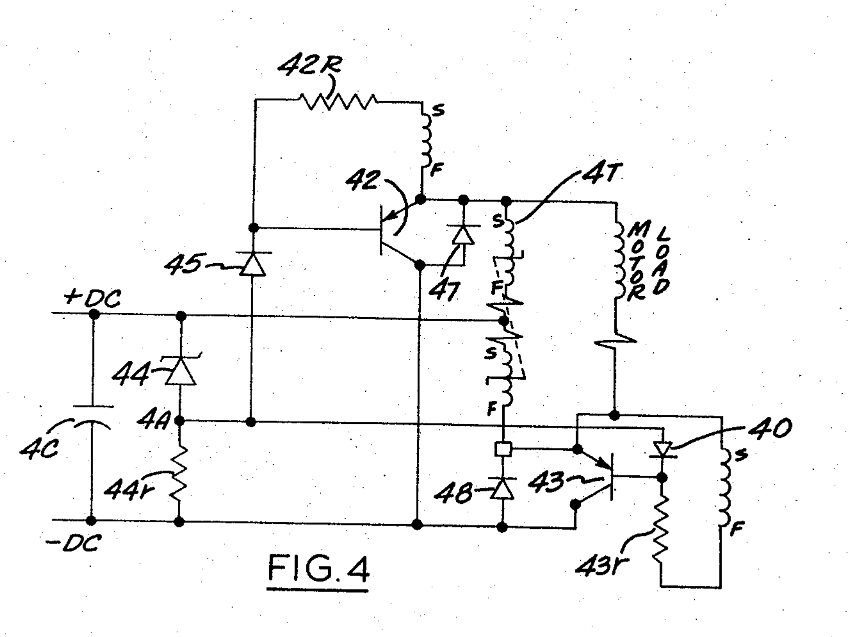
Figure 5:
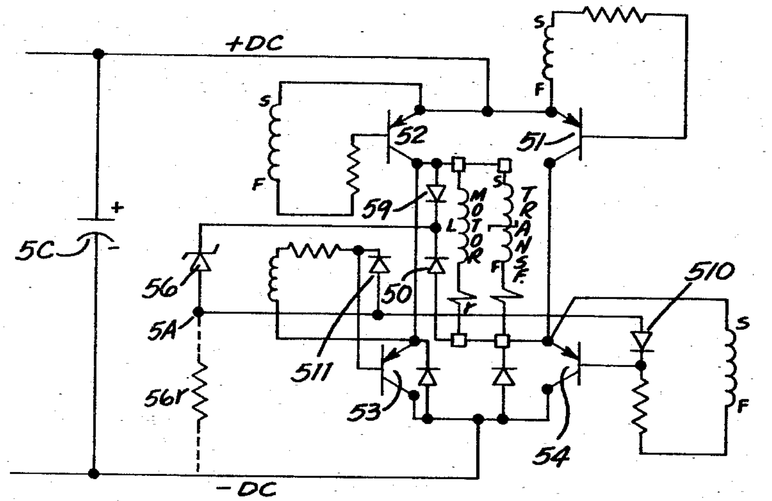
Figure 6:
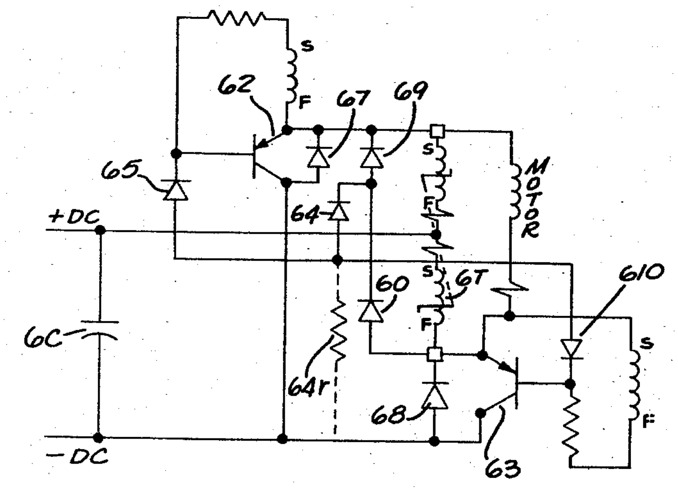
Figure 7:
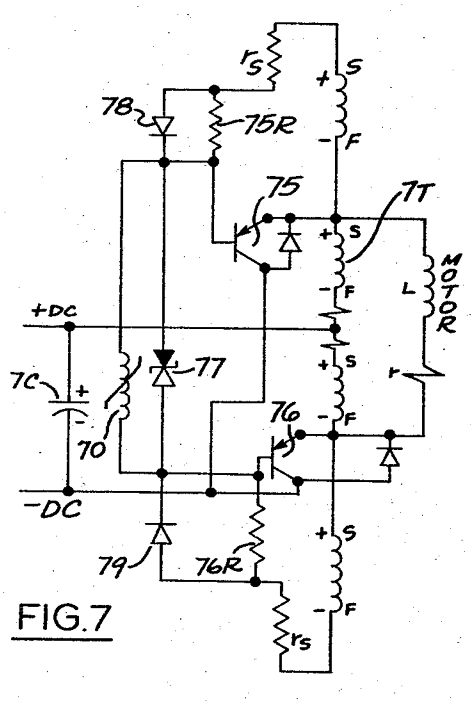
Figure 7A:
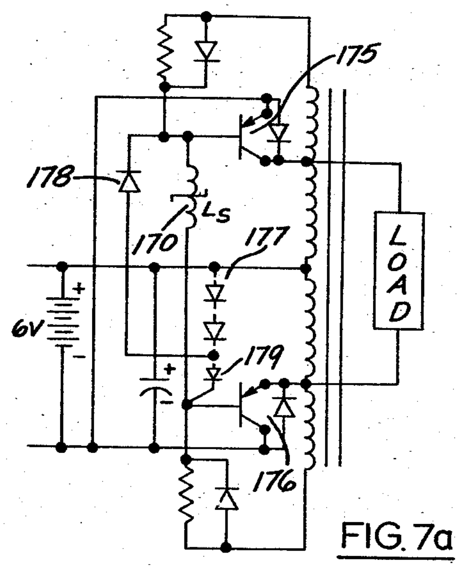
Figure 8:
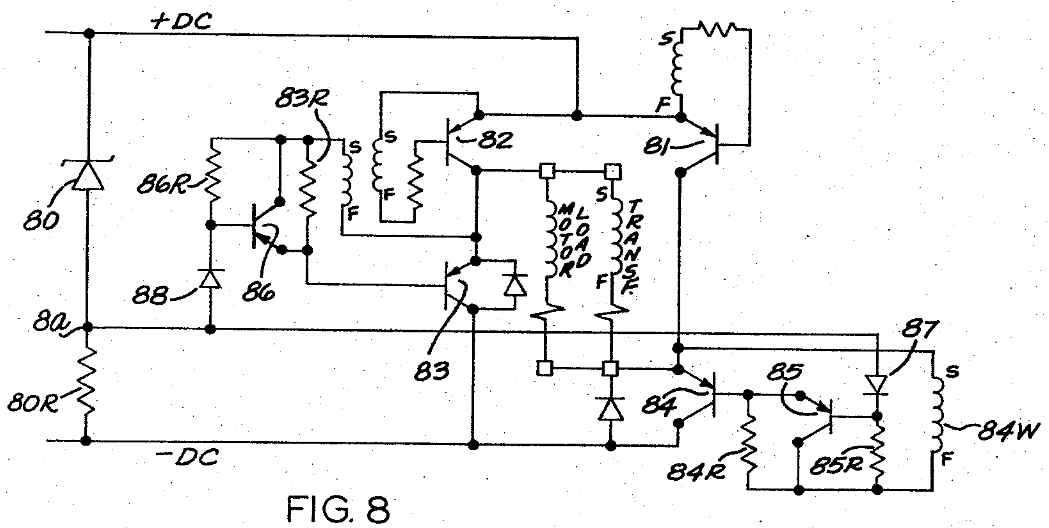
Figure 9:
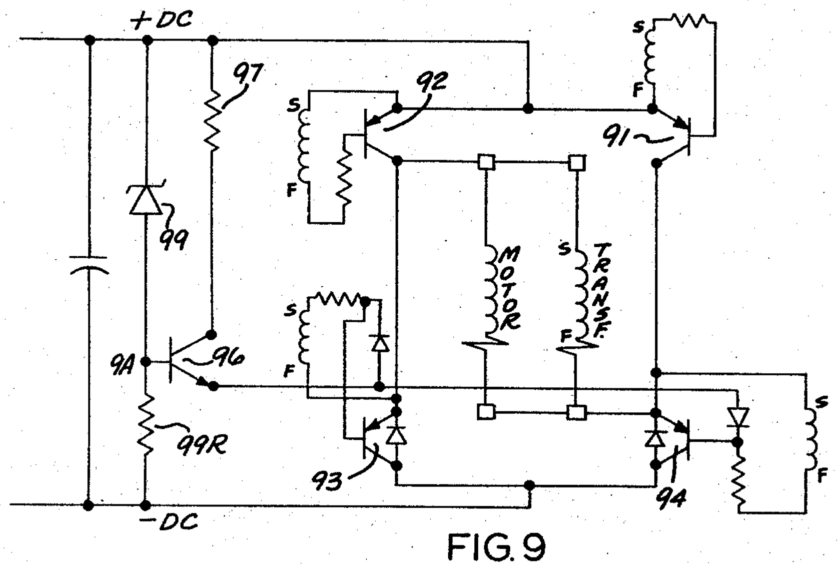
Figure 10:
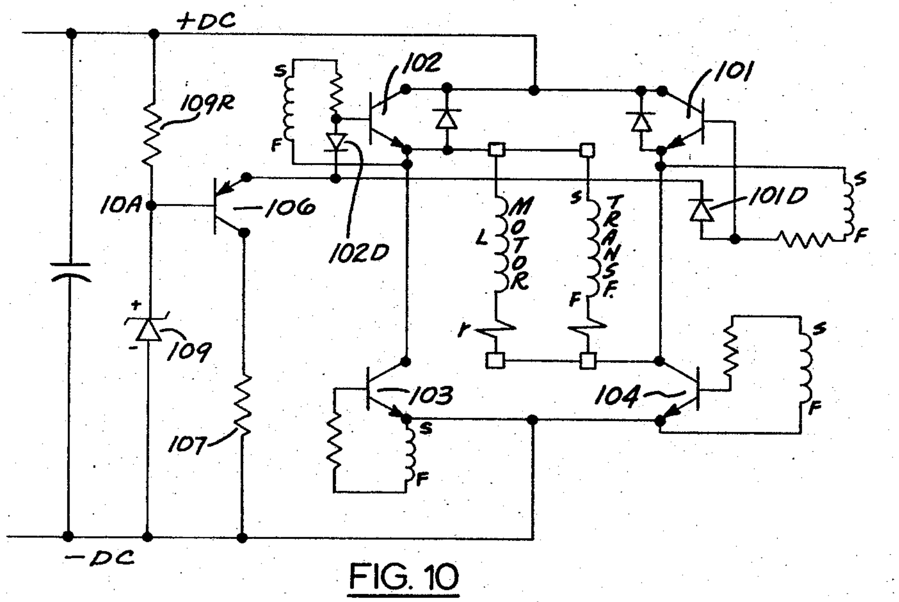
Figure 9A:
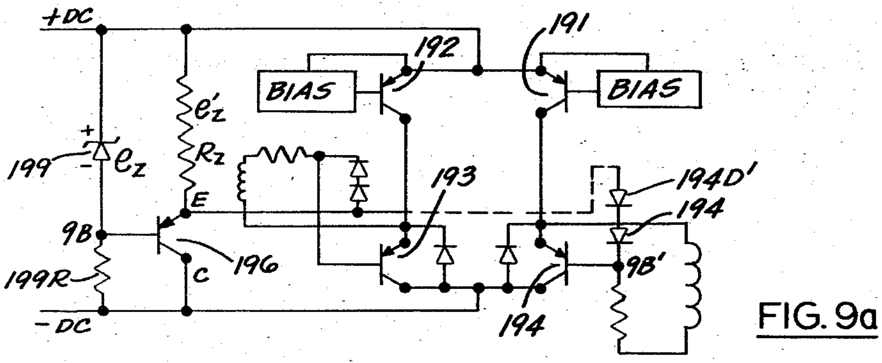
Figure 11A:
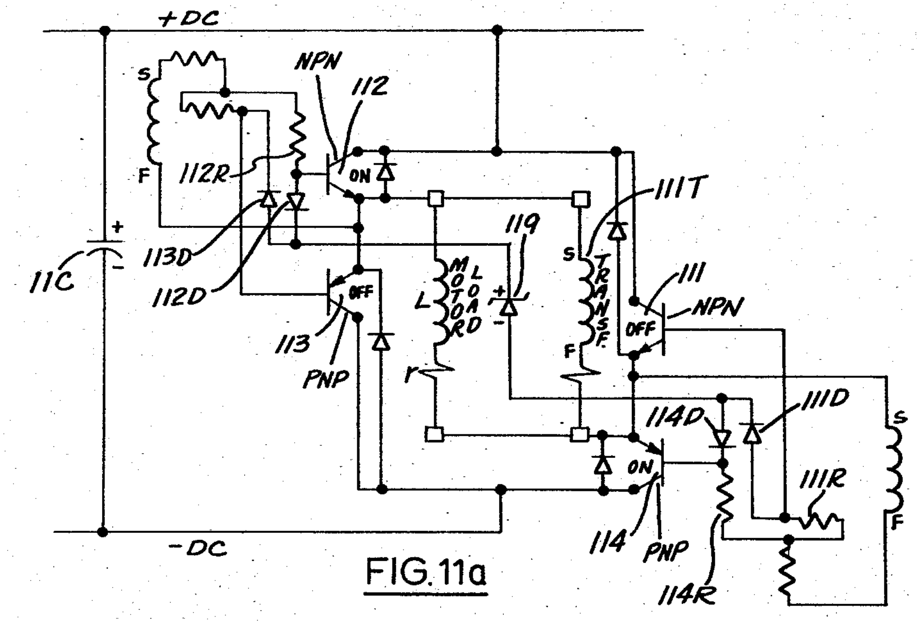
Figure 11B:
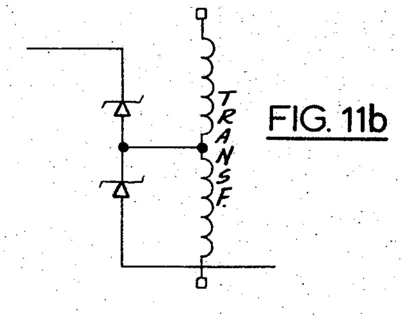
Figures 12, 13A, 13B:
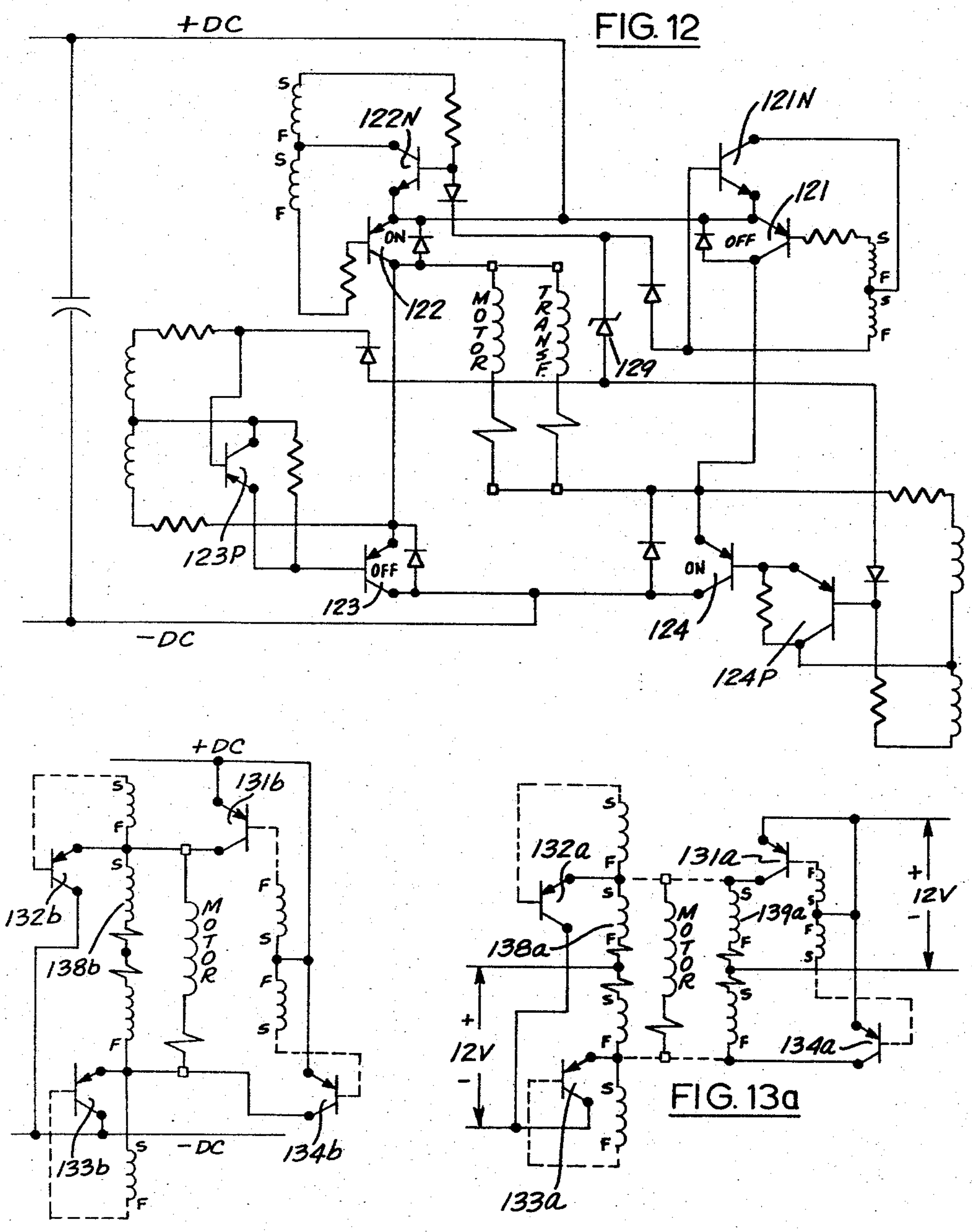

FIGURE 3 in a manner similar to FIGURES 1 and 2 shows a schematic approach to the contemplated invention in a bridge type network;

FIGURE 4 illustrates schematically an approach to the solution similar to that shown in FIGURE 3 but in a non-bridge type network;

FIGURE 5 presents in schematic form a practical application of the circuit illustrated in FIGURE 3;

FIGURE 6, in a manner similar to FIGURE 5 presents in schematic form a practical application of the circuit illustrated in FIGURE 4;

FIGURE 7 depicts schematically an improved version of the circuit of FIGURE 6;

FIGURE 7A shows schematically a modification of the circuit of FIGURE 7;

FIGURE 8 illustrates schematically another practical application of the circuit depicted in FIGURE 3;

FIGURE 9 illustrates schematically still another practical application of the circuit depicted in FIGURE 3;

FIGURE 9A shows schematically a modification of the circuit illustrated in FIGURE 9;

FIGURE 10 illustrates schematically the circuit version of FIGURE 9 but using NPN transistors;

FIGURE 11*a* shows schematically an ingenious combination of the PNP transistor circuit of FIGURE 9 with the NPN transistor circuit of FIGURE 10;

FIGURE 11*b* illustrates schematically a possible modification to the arrangement shown in FIGURE 11*a*;

FIGURE 12 illustrates schematically some simplification of the versions shown in FIGURES 11*a* and 11*b;*

Figure 14B:
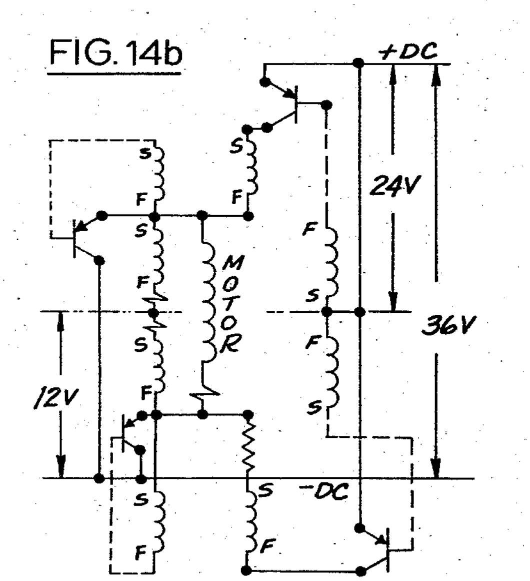
Figure 14A:
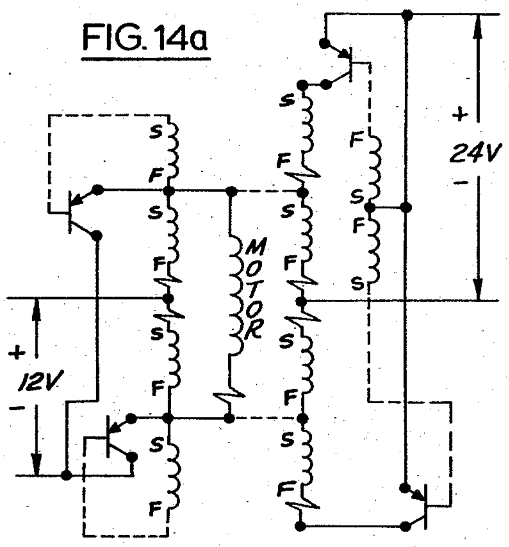
Figure 15A:
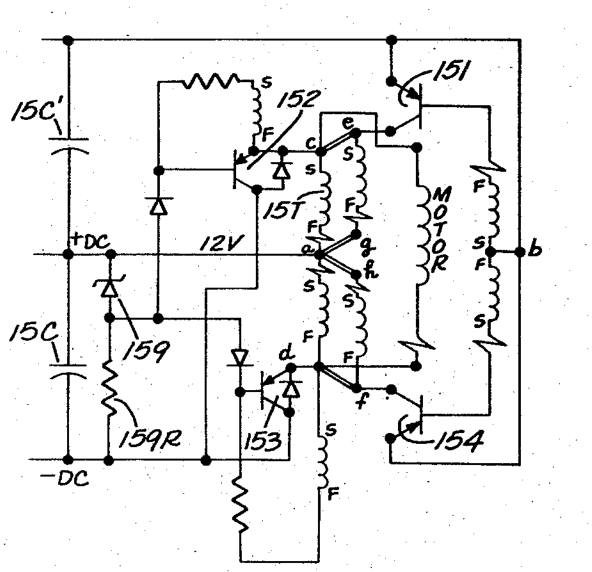
Figure 15B:
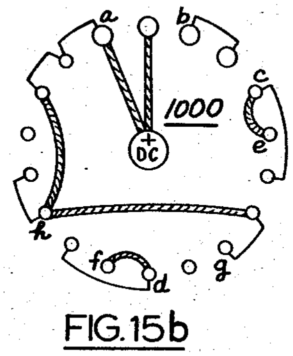
Figure 17A:
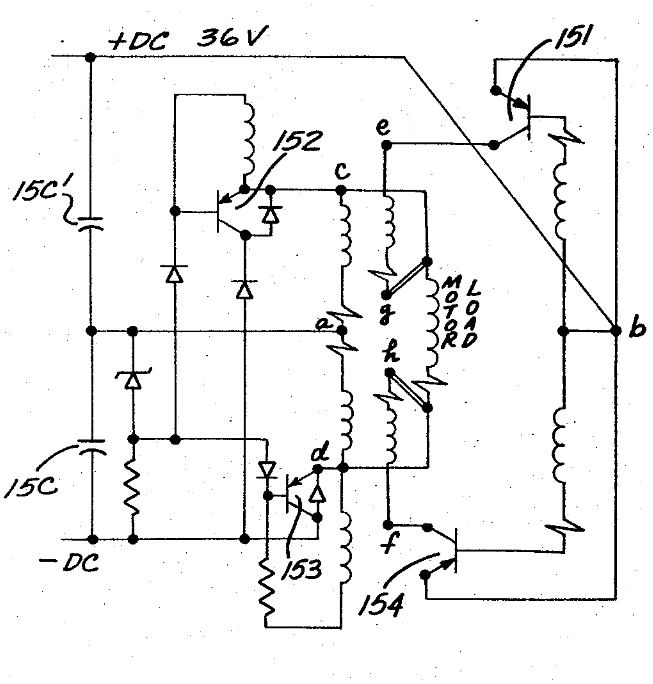
Figure 17B:
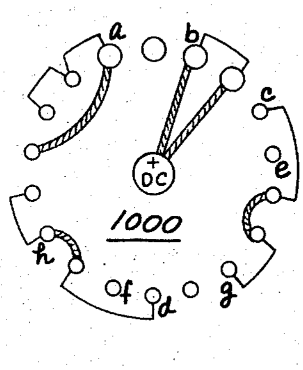
Figure 16A:
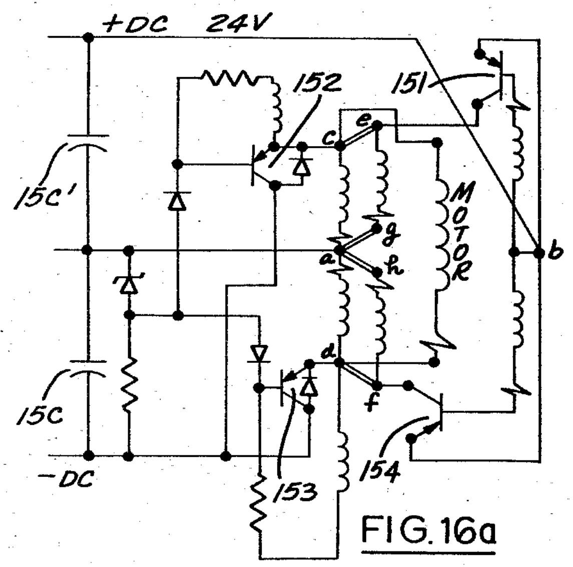
Figure 16B:
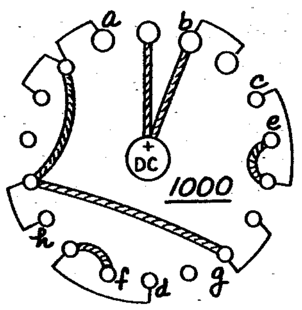

FIGURE 13*a* shows schematically the theoretical basis for the circuitry of the examples;

FIGURE 13*b* illustrates schematically how the concept of FIGURE 13*a* will be used on the examples;

FIGURE 14*a* in a schematic explanation similar to FIGURE 13*a* illustrating the theoretical basis for other circuitry of the examples;

FIGURE 14*b* illustrates schematically how the concept of FIGURE 14*a* will be used in the examples;

FIGURE 15*a* is a schematic wiring diagram for Example I;

FIGURE 15*b* shows a top view of some wiring connections of FIGURE 15*a*;

FIGURE 16*a* is a schematic wiring diagram for Example II;

FIGURE 16*b* shows a top view of some wiring connections for FIGURE 16*a*;

FIGURE 17*a* is a schematic wiring diagram for Example III;

FIGURE 17*b* shows a top view of some wiring connections for FIGURE 17*a*; and

Figure 18:
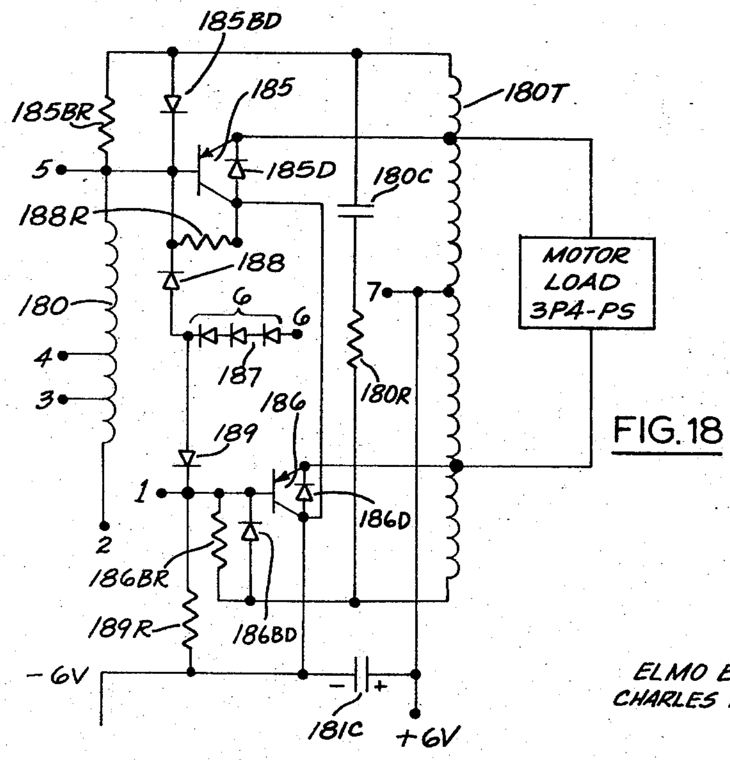

FIGURE 18 is a schematic wiring diagram for Example IV.

As is evident from the explanation already given, the circuits contemplated in the present invention must perform two functions: They must convert DC to AC; at the same time they must control the AC output voltage and frequency so that these remain fairly constant. Since both the output voltage and frequency are a function of the input voltage, the input voltage will first be considered. The regulation of the DC input is illustrated in FIGURE 1 in elementary form. Here there is shown an arrangement of four PNP transistors in a bridge circuit consisting of transistors 1, 2, 3, and 4, with the emitters of transistors 1 and 2 being connected, the collectors of transistors 3 and 4 being connected; the collector of transistor 2 is connected to the emitter of transistor 3 while the collector of transistor 1 is connected to the emitter of ransistor 4. The AC load, e.g., a motor, is depicted as an inductance L and a resistor *r*. The DC voltage from a battery B is supplied to the junction of the emitters of transistors 1 and 2 on the positive side and, indirectly to the junction of the collectors of transistors 3 and 4 on the negative side. For the simplified explanation of FIGURE 1, bias connections for the bases of the transistors are shown as a block.

Regulation for the bridge arrangement is supplied by a PNP series transistor 5 having its emitter connected to the junction of the collectors of transistors 3 and 4 and its collector connected to the negative terminal of battery B. Transistor 5 is thus in series between the negative terminal and the collector junctions of transistors 3 and 4. The base of transistor 5 is controlled by a Zener diode 6 and load resistor 6*r*, the base of transistor 5 being connected between Zener diode 6 and Zener load resistor 6*r*. The Zener diode 6 and its load resistor 6*r* are in parallel with the bridge circuit and its series transistor 5 across the terminals of battery B. The relatively constant reference-voltage across the Zener diode 6 pre-sets the portion of the DC voltage to be applied to bridge. Should the supply voltage $E_{DC}$ increase above the nominal minimal value, the amount of DC voltage applied to the converter would tend to increase in proportion. However, since the Zener voltage would remain essentially constant, and tendency for the voltage applied to the converter to increase would tend to decrease the emitter-to-base voltage of the series transistor 5, decreasing its base current consequently increasing its emitter-to-collector voltage drop to absorb the additional amount of $E_{DC}$ so as to maintain the original portion of $E_{DC}$ as applied to the bridge at an essentially constant value of voltage.

In this system of voltage regulation, as the supply voltage increases above a minimal value and the voltage drop across the series transistor 5 increases, its internal losses increase. The limit of regulation is reached at that supply voltage at which the transistor 5 losses have reached the limit of its watt dissipation. Also, obviously, as the supply voltage is increased the over-all efficiency of the system decreases because of the additional voltage drop across the series transistor 5.

In the circuit arrangement shown in FIGURE 1, all the current which passes through the DC to AC conversion transistors i.e., switching transistors 3, 4, (and, of course, through transistors 1 and 2), passes through series transistors 5. It is also possible to so control these transistor switches 3 and 4 so that, in addition to their converion function, they perform the function of series transistor 5 of FIGURE 1. In practice this works very successfully. To understand this operation, consider FIGURE 2 with two Zener diodes 27 and 28 in a parallel circuit with the load L and *r* and with a transistor-switch-bridge having transistors 21, 22, 23, 24. Each Zener diode branch has a load resistor 27*r* and 28*r*. The bases of transistors 23 and 24 are connected to junction points 2A and 2B between the Zener diodes 27, 28 and their load resistor 27*r*, 28*r*. Transistor 5 of FIGURE 1 is omitted. Transistors 21, 22 are switched from a saturated ON state to an open-circuited OFF state in a conventional manner. Transistors 23, 24 are switched from what may be termed various states of conductivity in the ON condition to an open-circuited OFF state. When transistors 21, 22 are OFF so too are transistors 23, 24 OFF; when transistor 21, 22 are ON in a saturated state, transistors 23, 24 are ON but are absorbing the amount of $E_{DC}$ which has to be used up in order to adjust the AC output voltage to a pre-determined constant value. Essentially constant frequency will be maintained if the AC output voltage is used to supply the emitter-to-base excitation circuits via a saturable core transformer type of arrangement.

It is also possible to reduce the two Zener diodes 27, and 28 to one. The emitter to base circuits of transistors 23 and 24 is mainly supplied by secondary windings of an excitation transformer. The base terminals have other connections shown in block diagram as bias in FIGURE 2. Since the two Zener diodes 27, 28 work alternately to control the output voltage it is possible to use only one such diode 39 as shown in FIGURE 3, in cooperation with two switching or coupling diodes 33D and 34D to achieve the same performance as the two Zener diodes 27 and 28.

Thus, in FIGURE 3 is shown a bridge consisting of PNP transistors 31, 32, 33, 34. Bias is supplied to bases by voltages induced in secondary windings and their resistors 31R, 32R, 33R, 34R which resistors represent also the internal resistance of the bias windings. The start and finish of the secondary windings are indicated by the letters S and F. Two coupling diodes, 34D and 33D, are coupled to junction 3A of Zener diode 39, and its resistor 39r and supply an over-riding bias to the bases of transistors 33 and 34.

FIGURE 3 shows a one half cycle of operation when transistor 32 is saturated ON and transistor 34 is regulating ON. Transistors 31 and 33 are OFF because of the polarity of their transformer secondaries. During this cycle, diode 34D conducts through 34R whereas diode 33D is non-conductive because the base of transistor 33 is more positive in potential than the base of transistor 34. Should the emitter potentials of either transistor 33 or 34 fall below the potential of midpoint 3A, the transistors 33 and 34 begin to open up, i.e., to absorb voltage during conduction instead of saturating, so as to regulate the AC output at the Zener diode level. The Zener diode is specially selected to meet these conditions.

When the bridge circuit is operated in the conventional manner, the switch-transistors are either fully ON or fully OFF. The low impedance of the emitter to base excitation circuit may be an adequate path for the discharge of inductive current caused by an inductive load.

However, when these transistors are operated as series regulators, the discharge path via collector-to-base-to-external base-resistance to-the-secondary-winding of transformer 3T, to the emitter (or the not unusual path into the collector and out of the emitter of PNP type transistors), is not adequate to bypass the inductive current in the collector circuit without the appearance of high voltages from the collector to the emitter, hence, shunting diodes 33D′ and 34D′ are required across the regulating transistors. Since a DC source such as a rectifier will pass only a unidirectional current a capacitance 3C is shunted across the terminals to supply a path for the reversed direction of current which must flow momentarily.

In FIGURE 4, the inventive concept of FIGURE 3 is carried out in a center-tapped circuit. The excitation transformer 4T has a saturable core represented symbolically by a lazy Z and its primary winding also serves as the transformer for the load, e.g., a motor, so that the motor load winding does not have to be center-tapped. The motor load operates at twice the source voltage. The "+" input terminal is coupled to the center-tap of the transformer with the "−" side connected to the collectors of the transistors.

Capacitor 4C is shunted across the input terminals, and the Zener diode 44 with its load 44r is in parallel with the capacitor 4C and the input. This time only two transistors 42 and 43 are used each with its excitation winding and resistors 42R and 43F. Each transistor also uses shunting diodes 47 and 48 and coupling diodes 40 and 45, in a manner similar to the circuit of FIGURE 3.

FIGURE 5 is a further modification of FIGURE 3 where it may not be desired to connect the anode-end of the Zener diode directly onto the "+" DC bus. In FIGURE 5, the anode-end of the Zener diode 56 is alternately connected, via two more diodes 50 and 59, to the most-positive end of the AC output voltage. The DC leads are to a bridge circuit having transistors 51, 52, 53, 54. The emitters of transistors 51 and 52 are connected to the "+" DC side and the collectors of transistors 53 and 54 are connected to the "−" DC side. The collectors of transistors 51 and 52 are connected to the emitters of transistors 54 and 53, respectively. Each transistor has its bias circuit, e.g., a resistor value and an inductive winding the start and finish of the windings being shown. Transistors 53 and 54 also have coupling diodes 511 and 510, respectively. Zener diode 56 is not connected to the DC bus directly but includes a theoretical junction-point 5A connected to transistors 53 and 54 through coupling diodes 511 and 510 and is connected to the most positive terminal of the load and transformer through diodes 50 or 59. FIGURE 5 represents the half cycle when diode 59 is conducting and 50 is non-conducting and there is a theoretical zener ballast resistor 56r.

In FIGURE 6, the concept of FIGURE 5 is used to couple the Zener diode to the center tapped circuit of FIGURE 4.

Thus in FIGURE 6, there are the two PNP transistors 62 and 63 each with its excitation winding and base resistor, the start and finish of the winding being indicated by S and F. The emitters are coupled to a saturating transformer 6T which is center tapped, the "+" DC input being fed to the center tap, the "−" DC being connected to the collector of transistors 62 and 63. A capacitor 6C is across the DC input. The Zener diode 64 is coupled to the AC output voltage through coupling diodes 60 and 69, and regulates the output from transistors 62 and 63 through coupling diodes 65 and 610. If desired, one may think of a keep-alive-current path through a theoretical ballast resistor 64r as existent between the Zener diode 64 and the "−" DC bus. In this arrangement, then the Zener diode voltage rating must be about twice as great as the voltage rating of FIGURE 4.

It is also possible to use the circuitry of FIGURE 6 for a non-saturating transformer as shown in FIGURE 7, which diagram represents operation during a one-half-cycle interval. There is the usual DC source, a capacitor 7C across the source. The "+" side of the DC bus is connected to the center-tap of transformer 7T, the start and finish of the windings being indicated; the "−" side of the DC bus is connected to the collectors of the transistors 75 and 76. Zener diode 77 is coupled to the transistor bases at the bias diodes 78 and 79. In the half cycle shown, transistor 76 is conducting and regulating; transistor 75 is non-conducting. On one polarity, one half-section of the AC Zener diode acts as a diode and the other half section functions as a Zener, then vice versa on reversed polarity, so the symbol is therefore two Zener diodes back-to-back and shown schematically as both a Zener and diode; one triangle blackened solid, the other triangle clear. Such a representation should be reversed for each half cycle. Diode 78 is conducting to bypass 75R whereas diode 79 is non-conducting so as to cause 76R to act as a transistor bias. The secondary windings of the transistor excitation have an internal resistance indicated here as $r_s$ of the type already mentioned in connection with FIGURE 3. Since transformer 7T is not a saturable core transformer, a saturable core inductor 70 is provided in parallel with the Zener diode. This constant-volt-second characteristic of this saturable core fixes the frequency. Its voltage is the constant voltage of the AC Zener diode 77 hence, a given volt-second design results in maintaining the seconds, which is the time of the switching frequency, constant. Since diode 78 by-passes resistor 75R this means that the current flowing through resistor 76R, so as to set the base level of transistor 76, does not affect the base level of transistor 75. Thus, resistor 76R and base of transistor 75 is not prematurely turned on. The same thing happens to transistor 76 during the next half cycle.

An interesting modification of the circuit of FIGURE 7 is shown in FIGURE 7A. Transistors 175 and 176 of FIGURE 7A correspond to transistors 75 and 76 of FIGURE 7. Saturable core 170 corresponds to saturable core 70 of FIGURE 7. This saturable core is the core which determines the frequency, and is coupled to the base of the transistors. The arrangement is a center-tap arrangement the "+" side of the power source going to the center-tap of the main transformer (whose core does not saturate), the collectors of the transistors are connected to the "−" bus line. However, this circuit has no Zener diode. Instead of Zener diode 77 there is a string of diodes 177 between the center top "+" line and the coupling diodes 178 and 179. This string of diodes 177 act as a constant DC voltage control in place of the Zener diode. This arrangement is particularly useful for circuits supplying a low voltage such as 6 volts. The string of diodes will control above a fixed value of supply voltage, such as 6.5 volts in a circuit which is to be efficient between 5.5, and 6.5 volts.

One of the limitations of a simple regulator circuit like that of FIGURE 3 is that the current through the Zener diode may become quite large, particularly when regulating against an abnormally high input votlage. The current through the Zener diode is in some measure related to the base current requirements of the transistors which are being opened-up. Some of the less expensive power transistors do not have much current gain in the region of the so-called "rated current" value of collector current, so that the base-current must be made a large part of the collector-current value to produce saturation conditions. As shown in FIGURE 8, by the use of one or more additional transistors, it is possible to reduce the Zener current considerably so as to minimize the Zener watts and allow the use of a physically smaller Zener diode. To properly appreciate the circuit of FIGURE 8, it is helpful to understand the operation of Darlington coupled transistors. This is because in appearance, the circuit of FIGURE 8 resembles Darlington coupled transistors but it is precisely the opposite in effect. In a Darlington-coupled pair of transistors, the collectors of the driver and driven pairs of transistors are connected. The base of the driven transistor is coupled to the emitter of the driver transistor. Since the emitter to base voltage of the driven transistor is greater than its emitter to collector voltage, no matter how low a voltage drop is achieved in the driver transistor, the base of the driven transistor cannot be made lower in potential than its collector so that there is no saturation. This is not true in the circuit of FIGURE 8.

In the circuit of FIGURE 8, there is a Zener diode 80 with its load resistor 80R and the center point 8A. The Zener diode circuit is in parallel with the DC source. There is a bridge of four transistors 81, 82, 83, 84. Transistors 81 and 82 are emitter connected, the function of the emitters being connected to the "+" DC bus. Transistors 83 and 84 are collector connected, the function of the collectors being connected to the "—" DC bus. The collectors of transistors 81 and 82 are respectively connected to the emitters of transistors 84 and 83. The output transformer, and the motor load for example, are in parallel and connected between the collector of transistor 82 and the emitter of transistor 84. Transistors 83 and 84 at first glance appear to be Darlington coupled to their driver transistors 85 and 86 respectively. They are not. Transistor 84 includes a base bias resistor 84R and its base is coupled to the emitter of transistor 85, the collector of transistor 85 is connected to resistor 84R. The base of transistor 85 includes bias resistor 85R and coupling diode 87 connected to center point 8A of the Zener diode and its load. The bias winding 84W is connected between the emitter of transistor 84 and its base bias resistor 84R and to the base bias resistor 85R and the collector of transistor 85, the start S of the winding being towards the emitter of transistor 84. With this arrangement, the potentinal of the base of transistor 84 can be made much lower than the collector of transistor 84 since the potential of the finish side of the excitation winding F is below the "—" DC voltage. Transistor 83 is similarly coupled to transistor 86, the emitter of transistor 86 being connected to the base of transistor 83 and the base of transistor 86 leading to bias resistor 86R and coupling diode 88.

Since transistors seemingly cost less in the present market than diodes, the circuit of FIGURE 8 would be less expensive than the circuit of FIGURE 3, if it were not for the necessity of coupling diodes 87 and 88. However, the need for these diodes is evident from an examination of the current path from the "+" DC line through transistor 82 (which is assumed to be conducting) and then through the emitter-to-base of transistor 83 (which is assumed to be non conducting), and then through the emitter-to-base of driver transistor 86 and from there to the negative terminal of Zener diode 80 if coupling diode 88 were not present. This path constitutes practically a short circuit around the Zener diode and would serve to completely turn-off transistor 84 in the absence of diode 88.

A less expensive, and possibly more efficient, but perhaps less effective way of accomplishing the objective of FIGURE 8, i.e., require less from the Zener diode so as to use a smaller size Zener diode, is shown in FIGURE 9.

FIGURE 9 has the same components as FIGURE 3, i.e., bridge transistors 91, 92, 93, 94 fed by the "+" and "—" bus lines of the DC source with Zener diode 99 and its load resistor 99R in parallel with the source. Connected to the center point 9A of the Zener diode 99 and its load resistor 99R, is an NPN power transistor 96. The base of NPN power transistor 96 is connected to midpoint, 9A. The collector is connected to the "+" DC line across a load resistor 97 and the emitter is connected to the regulating transistors 93 and 94.

An alternate approach to the problem using all PNP transistors is contained in FIGURE 9A, having a four-bridge circuit with transistors 191, 192, 193, 194, a Zener diode 199 with its resistor 199R the same as the corresponding components similarly numbered in FIGURE 9 but, with a PNP transistor 196 replacing NPN transistor 96. The base of transistor 196 is coupled to junction 9B between the Zener diode 199 and its resistor 199R. Coupling diodes e.g. diode 194D connect the emitter of transistor 196 to the base of transistor 194 at a base junction point 9B′. The emitter resistor is connected to the "+" terminal and numbered $R_z$.

The voltage $e_z'$ across resistor $R_z$, is maintained approximately equal to Zener diode voltage $e_z$ by the "emitter follower" action of the transistor 196. Now, the current which the Zener diode circuit must conduct is a measure of the base current of transistor 196 instead of the base current of transistors 193 and 194. At low $E_{DC}$ values, the Zener may not be operating into its Zener voltage region (i.e. practically non-conducting) so that the voltage drop across $R_z$ is pre-set by the base current thru transistor 196 which is in turn, determined at this $E_{DC}$ level by the value of resistor 199R. Because point 9B′ of the ON transistor 194 may be at a potential lower than that of the "—" DC bus, and the potential of base junction 9B of transistor 196 cannot quite reach as low as the potential of the "—" DC bus, it may be necessary to use several coupling diodes in series i.e. 194D and 194D′ to absorb this voltage difference before conduction occurs thru these coupling diodes.

It is possible to use NPN transistors instead of PNP transistors in the other circuit arrangements. The NPN circuits are merely upside-down arrangements of the PNP circuits. For example, FIGURE 10 is an upside down arrangement of FIGURE 9 Four NPN transistors 101, 102, 103 and 104 are used in the bridge. The capacitor 10C is in parallel across the DC input and so is the Zener diode 109 with its load resistor 109R.

A PNP power transistor 106 now plays the role of NPN transistor 96 of FIGURE 9. The base of PNP transistor is coupled to the midpoint 10A of Zener diode 109 and its load resistor 109R. The collector of power transistor 106 is connected to the "—" DC line across resistor 107. The emitter of transistor 106 is connected to the base-terminals of transistors 102 and 101 via coupling diodes 102D and 101D, respectively. Now transistors 101 and 102 accomplish the regulation with transistors 103 and 104 performing only the switching. FIGURE 10 represents the half cycle when transistors 102 and 104 are conducting while transistors 101 and 103 are off.

In the circuits where two transistors act as regulator units, the series losses are distributed between the two transistors. As shown in FIGURE 11*a*, it is possible to make all four transistors act as regulators and thus divide the series losses four ways.

FIGURE 11*a* shows a bridge type arrangement with capacitor 11C in parallel with the DC source. The bridge consists of two NPN transistors 111, 112 and two PNP transistors 113 and 114. The collectors of the two NPN transistors are coupled and the collectors of the two PNP transistors are coupled, and the emitters of the NPN transistors are connected to the emitters of the PNP transistors, respectively. The "+" DC is connected to the junctions of the two NPN collectors while the "—" DC is connected to the junction of the two PNP collectors. The base of NPN112 transistor is connected to the base of PNP transistor 113 through the bias resistors for the bases. Zener diode 119 is coupled into the four bases by four coupling diodes 111D, 112D, 113D, 114D numbered for the corresponding transistors. The circuit of FIGURE 11*a* represents the half-cycle when transistors 112 and 114 are conducting while transistors 111 and 113 are non-conducting. During this cycle diodes 112D and 114D are conducting through resistors 112R and 114R while diodes 111D and 113D are non-conducting as explained in connection with the description of FIGURE 3. The excitation transformer 111T and load are in parallel and coupled to the emitters of transistors 112–113, and 111–114. The circuit of FIGURE 11*a* presupposes that the characteristics of the NPN and the PNP transistors are sufficiently alike to divide the series losses equally. In the event that this requirement cannot be met, a division of the series losses may still be had by using a second Zener diode. The junction of the two Zener diodes is connected to the center tap of the excitation transformers as shown in FIGURE 11*b*.

FIGURE 12 uses some of the concepts of FIGURES 8 and 11. This is a bridge circuit using driver and driven transistors. The driven PNP transistors are 121, 122, 123, 124. 121 and 122 have a common emitter, 123 and 124 a common collector, and the collectors of 121 and 122 are connected to the emitters of 124 and 123 respectively. The DC bus lines are connected to the common emitters and common collectors. PNP transistors 121 and 122 are driven by NPN transistors 121N and 112N whereas PNP transistors 123 and 124 are driven by PNP transistors 123P and 124P. Driver and driven transistors 123P, 123 and 124P, 124 are coupled as already described in connection with the explanation of FIGURE 8. However, transistors 121, 121N and 122, 122N are connected so that the emitters of the driver transistors 121N, 122N are connected to the emitters of the driven transistors. The Zener diode 129 is coupled to the bases of the four drivers transistors via four coupling diodes. In the circuit of FIGURE 11 extended windings are used on the base excitation transformers to allow the driven transistors to operate more nearly into saturation.

The explanation until now has been of individual circuits. However, the present invention contemplates a versatile arrangement whereby one group of components can be used for a plurality of circuits. In fact, in practice, one circuit board having the components described mounted thereon can provide several of the circuits hereinbefore described.

For the purpose of giving those skilled in the art a better appreciation of the advantages of the invention, the following illustrative examples are given:

Before going into the examples, it is first essential to see what the examples are to accomplish.

Consider first the circuit of FIGURE 13*a*. This circuit is a combination of two (2) transistor circuits, each fed with separate 12 volt D.C. connected to two outer tapped excitation transformers, i.e., on the one side transistors **131*a* and 134*a* are emitter coupled supplied by the "+" D.C. The "—" D.C. going to the collector through the center of excitation transformer 139*a*. Transistors 132*a* and 133*a* are collector coupled, and fed by the other "—" 12 volt D.C., its "+" D.C. terminal going to the center of excitation transformer 138*a*. These are thus two circuits connected in the one and the other direction, both circuits being connected to center tapped excitation transformers 138*a* and 139*a***. A 24 volt circuit as shown in FIGURE 13*b* may then be considered to be two 12 volt center tapped circuits without the center tap since the circuit of FIGURE 13*b* with its four transistors **131*b*, 132*b*, 133*b*, and 134*b*** is the same as the circuit of FIGURE 13*a* but without one winding since it has only excitation transformer **138*b*** and without use of a center tap.

As shown in FIGURE 14*a* the two circuits do not have to be of equal voltage since FIGURE 14*a* shows an arrangement with 24 volts in one circuit and 12 volts on the other. The circuit of FIGURE 14*b* corresponds of course to the circuit of FIGURE 14 and shows how a 36 volt circuit can be considered to be two separate 12 volt and 24 volt circuits center tapped, combined into one circuit without use of the center tap.

With the foregoing concept in view, it is possible to provide a multi-use circuit mounted on a circuit board with a tap-switch or positionable connection-changing disc by which the circuit can be changed readily from a 12 volt to a 24 or 36 volt device by switching a few lead wires. This circuit board is shown with a disc-type connection changer in FIGURES 15*b*, 16*b*, 17*b* using screw connections once the disc has been positioned. On one side of the disc is shown the circuit interconnections depicted in FIGURES 15*a*, 16*a* and 17*a*. From the circuits hereinbefore described, it is apparent that it is possible to convert from one circuit to another, with a few changes in wire connections.

EXAMPLE I—12 VOLTS

In FIGURE 15*a* are four transistors 151, 152, 153 and 154, a D.C. input, a Zener diode 159 and its resistor 159R, and a center tapped transformer 15T. The following connection points are provided on connection disc 1000:

(a) Center tap from "+" D.C. input line to the excitation transformer.
(b) Tap to the connection line of the two emitter connections of transistors 151 and 154.
(c) Connection to junction of excitation transformer and emitter of transistor 152.
(d) Connection to junction of transformer and emitter of transistor 153.
(e) Connection to collector of transistor 151.
(f) Connection to collector of transistor 154.
(g) Connection from finish of transformer, starting at collector of transistor 151.
(h) Connection from start of excitation winding, its finish at the collector of transistor 154.

FIGURES 15*a* and 15*b* show the circuitry and disc positions, respectively, for a 12-volt operation. Here the line from the "+" terminal goes to the center tap connection "*a*." In this circuit, only transistors 152 and 153 whose collectors are connected to the "—" D.C. terminal are used.

The excitation transformer must handle the load, or motor, current and becomes more of a power transformer. Saturation of main transformer core fixes the frequency.

EXAMPLE II—24 VOLT OPERATION

The device of FIGURE 15*a* is used in FIGURE 16*a* for 24 volt operation. The circuit as shown in FIGURE 16*a* is of bridge configuration using all four transistors. Transistors 152, 153 having their collectors connected to the "—" D.C. supply terminal are the regulators. Center tap terminal (a) serves only as a source of 12 volt D.C. for the Zener diode regulator circuit. The "+" D.C. is fed to junction point (b) of the emitters of transistors 151 and 154. This circuit is the same as that of FIGURE 13*b*. The circuit of FIGURE 16*a* is formed from the circuit of FIGURE 15*a* by taking the connection disc 1000 of FIGURE 15*b* and moving it clockwise by one terminal distance so as to change the circuit interconnections to those shown in FIGURE 16*b*.

EXAMPLE III—36 VOLT OPERATION

For the 36 volt, the non-symmetrical bridge circuit illustrated theoretically in FIGURES 14*a* and 14*b* is used, as shown in FIGURE 17*a* which is formed by rotating the disc clockwise by one more terminal position to set up the circuit interconnections shown in FIGURE 17*b*. The two transistors 152 and 153 are used as regulators. The center tap serves only as a source of 12 volts for the Zener diode regulator circuit. The "+" 36 volt line is connected to the junction (b) of the two emitters of transistors 151 and 154. The motor load connections are unchanged from those of FIGURES 15*a* and 16*a*, namely transformer terminals "C" and "*d*."

EXAMPLE IV

FIGURE 18 is another example of a multi-purpose assembly of components and is a device of the type shown in FIGURE 7A. Since this circuit relates to a concrete example, all of the important components are shown in the drawing. Two PNP transistors 185 and 186 are connected in a center-tapped circuit. The motor load is connected across the transformer from emitter to emitter of the transistors 185 and 186. The input voltage is 6 volts to the center tap of transformer 180T whose ends are connected through resistors 185BR and 186BR to the bases of transistors 185 and 186. Across each transistor between the emitter and collector is a shunting diode 185D and 186D. Another shunting diode 185BD and 186BD is in parallel with each base resistor 185BR and 186BR. Coupling diodes 188 and 189 are coupled to the bases and starting bias resistors 188R and 189R are connected between the bases and collectors of transistors 185 and 186, respectively. Regulation reference voltage is supplied by a string of six diodes 187 connected to the coupling diodes 188 and 189 and connected at pin 6 to center-tap pin 7.

The package of the example is very versatile. It contains provisions for unregulated and regulated outputs. It also contains a "switchable" indicator for 3 different operating frequencies, and a provision for an external "switcher" of a frequency of the operator's choosing above 490 c.p.s., the frequency of the power transformer itself saturating. The methods of adjusting the above conditions is by pin shorting plugs. There are 9 conditions. They are:

(1) External switcher unregulated.
(2) External switcher regulated.
(3) About 520 c.p.s. unregulated.
(4) About 520 c.p.s. regulated.
(5) About 540 c.p.s. unregulated.
(6) About 540 c.p.s. regulated.
(7) About 595 c.p.s. unregulated.
(8) About 595 c.p.s. regulated.
(9) About 495 c.p.s. regulated (main core saturating).

In addition to the 9 above conditions there is one more, without a plug, the conditions are about 490 c.p.s. unregulated, main core saturating.

The plug terminal-connections shown in the drawing are:

Pin 1 To junction of coupling diode 189 and base of transistor 186.
Pin 2 To saturable core 180 at start.
Pin 3 To saturable core 180 at ¾ winding position, approximately.
Pin 4 To saturable core 180 at ½ winding position, approximately.
Pin 5 To junction of coupling diode 188 and base of transistor 186 as well as finish of saturable core 180 winding and base bias resistor 185BR.
Pin 6 To input to series diodes 187.
Pin 7 To center tap of main transformer 180T.

The results tried with two different motors at about 6 volts are tabulated hereafter.

The various conditions are pre-selected by connecting certain points. For example 520 c.p.s. unregulated results wherein pin 1 is connected to pin 2. 550 c.p.s. regulated results when pins 1 and 3 are connected and when pins 6 and 7 are connected.

3PZ–PS/110 MOTOR

| Ein | Iin | $F_o$ | R.p.m. |
|---|---|---|---|
| 520 UNREGULATED | | | |
| 5.5 | 4.4 | 499 | 14,100 |
| 6.0 | 4.8 | 522 | 14,850 |
| 6.5 | 5.4 | 545 | 15,600 |
| 520 UNREGULATED | | | |
| 5.5 | 4.8 | 514 | 14,300 |
| 6.0 | 5.2 | 520 | 14,600 |
| 6.5 | 5.2 | 510 | 14,400 |
| 7.0 | 5.3 | 505 | 14,250 |
| 550 UNREGULATED | | | |
| 5.5 | 4.6 | 525 | 14,700 |
| 6.0 | 5.2 | 553 | 15,600 |
| 6.5 | 5.6 | 570 | 16,200 |
| 550 REGULATED | | | |
| 5.5 | 5.0 | 535 | 15,000 |
| 6.0 | 5.5 | 550 | 15,300 |
| 6.5 | 5.5 | 540 | 15,250 |
| 7.0 | 5.5 | 535 | 15,000 |

3P4–PS/110 MOTOR

| Ein | Iin | $F_o$ | R.p.m. |
|---|---|---|---|
| 590 UNREGULATED | | | |
| 5.5 | 4.9 | 555 | 15,400 |
| 6.0 | 5.8 | 592 | 16,600 |
| 6.5 | 6.6 | 620 | 17,400 |
| 590 REGULATED | | | |
| 5.5 | 5.4 | 575 | 15,800 |
| 6.0 | 6.0 | 585 | 16,800 |
| 6.5 | 6.0 | 580 | 16,100 |
| 7.0 | 6.0 | 578 | 16,050 |
| Note: 10.0 | 6.2 | 565 | 15,800 |
| UNREGULATED[1] | | | |
| 5.5 | 4.6 | 480 | 13,800 |
| 6.0 | 4.4 | 445 | 12,600 |
| 6.5 | 5.4 | 533 | 14,200 |
| REGULATED[1] | | | |
| 5.5 | 4.7 | 440 | 12,500 |
| 6.0 | 5.1 | 463 | 13,150 |
| 6.5 | 5.2 | 466 | 13,300 |
| 7.0 | 5.4A | 479 | 13,400 |

[1] Main Core Setting Frequency.

It is to be observed therefore that the present invention provides for using the power transistors of DC to AC converter circuit for series regulation of output voltage while at the same time performing their switching function as converters. The invention concept can be applied to: Two power transistors of a center-tapped circuit; two of the four power transistors of a bridge circuit; all four power transistors of a bridge circuit; half-of or all of the transistors of a polyphase circuit.

The advantages of this concept resides primarially in the simplicity of circuitry and minimization of circuit components, the distribution of these series losses over several transistors, the ability to maintain frequency more constant since the voltage is regulated. (This is particularly important when RC circuits are used to set frequency rather than saturable cores), and frequency regulation by separate saturable-core inductor, if desired, so as to allow the output transformer to be non-saturable and to allow closer control of frequency.

The invention also provides for a circuit which may operate from a 12-volt, or a 24-volt, or a 36-volt DC supply by a quick change of several circuit connections, yet allowing a maximum usage of essential components.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. A transistorized conversion and regulation circuit to produce a regulated AC signal from a DC source comprising constant reference voltage means coupled to said source to set the source voltage supplied to the conversion and regulation circuit, and saturable voltage absorbing means to absorb DC voltage in excess of a predetermined constant value, said saturable voltage absorbing means including at least two transistors acting as power transistors, and excitation means coupled to said at least two transistors in opposite phase and in feedback relationship so connected that when DC potential is applied to the circuit, one of said at least two transistors starts to conduct, building up a potential in said excitation means until the limit of the conducting transistor is reached, at which point, the potential in said excitation means is of opposite polarity to that in said conducting transistor, exciting the second of the at least two transistors to conduct in opposite phase to said one transistor until the limit of conduction of said second transistor is reached and the cycle is repeated.

2. The circuit claimed in claim 1, having 4 PNP transistors in a bridge circuit which includes said at least two transistors acting as power transistors, two being emitter coupled, two being collector coupled, the collectors in the emitter coupled pair being joined to the respective emitters of the collector coupled pair, the positive DC input being fed to said emitter coupled pair, the negative DC input being fed to said collector coupled pair, the output connected between the two pairs of emitter-collector junctions, and said constant reference voltage means including at least one Zener diode in series with a resistor across said DC input, the bases of each of the collector-coupled transistors being connected to the junctions of said Zener diode and its resistor.

3. The circuit claimed in claim 1, having 4 PNP transistors in a bridge circuit which includes said at least two transistors acting as power transistors, two being emitter coupled, two being collector coupled the collectors in the emitter coupled pair being joined to the respective emitters of the collector coupled pair, the positive DC input being fed to said emitter coupled pair, the negative DC input being fed to said collector coupled pair, the output connected between the two pairs of emitter collector junctions, and said constant reference voltage means including at least one Zener diode in series with a resistor across said DC input and, coupling diodes, the bases of each of the collector coupled transistors being connected to one of the junctions of said Zener diode and its resistor through said coupling diodes.

4. The circuit claimed in claim 2, there being two Zener diodes and resistors, across said DC input, the bases of each of said collector coupled pairs being coupled directly to a different Zener diode and resistor junction.

5. The circuit claimed in claim 2, there being a center tapped source and said constant reference voltage means including only one Zener diode and resistor, connected at one end to said center tap, said bases being coupled to said Zener diode and resistor junction through coupling diodes, and diodes in opposite phase shunted between the collector and emitter of said emitter coupled transistors.

6. The circuit of claim 1, said constant reference voltage means being a Zener diode joined to a resistor, coupling diodes joining said transistor bases to said Zener diode and resistor junction, said saturable voltage absorbing means being a frequency setting saturable core device connected between the emitters of the two power transistors.

7. The circuit of claim 1 there being 4 PNP transistors in a bridge circuit which includes said at least two transistors acting as power transistors, two being emitter coupled, two being collector coupled, the collectors in the emitters coupled pair being connected to the emitters of the collector coupled pair, the positive DC input being fed to said emitters coupled pair, the negative DC input to said collector coupled pair, a saturable transformer connected between one of said collectors of the emitter coupled pair to one of the emitters of said collector coupled pair, diodes joined in opposite phase, disposed in parallel with said saturable voltage absorbing means, coupling diodes connected to the bases of said collector coupled transistors, and said constant reference voltage means including a Zener diode coupled to said junction of said opposite phase diode pair and to said coupling diodes leading to the bases of said collector coupled transistors.

8. The circuit of claim 1 there being two transistors, said saturable voltage absorbing means including a saturable transformer coupled to the two transistor emitters, diodes joined in opposite phase disposed in parallel with said transformer, coupling diodes connected to the bases of said transistors, said constant reference voltage means including a Zener diode connected to the junctions of said opposite phase diodes pair and to said coupling diodes leading to the bases of said transistors.

9. A circuit claimed in claim 1 including a DC input, a capacitor across said input, a center tapped output transformer including primary and secondary windings, the positive DC input going to the center tap, a pair of collector coupled PNP transistors, including feedback windings therefor, the emitters thereof being fed by said feedback windings in series with the outer ends of the primary winding of said output transformer, a bias resistor between the emitter and bases of said transistors, a saturable core joined to said bases, said constant reference voltage means including a double ended Zener diode in parallel with said saturable core; and, coupling diodes in opposite phase in parallel with said bias resistor and in series with said feedback windings and Zener diode.

10. The circuit of claim 1 including a DC input, a center tapped output transformer, the positive DC going to said center tap, a pair of collector coupled PNP transistors, the emitters thereof being fed by the outer ends of said center tapped transformer, a feedback winding joined to a bias resistor between the emitter and base of said transistor, a saturable core joined to said bases, coupling diodes connected to said bases, and a plurality of diodes between said center tap and said coupling diodes.

11. The circuit of claim 1, there being first, second, third and fourth PNP transistors in a bridge circuit which includes said at least two transistors acting as power transistors, the first two being emitter coupled, the second two being collector coupled, the collectors in the emitter coupled pair being connected to the emitters in the collector coupled pair, the positive DC input being fed said emitter coupled pair, the negative DC input being fed said collector coupled pair, said constant reference voltage means including a Zener diode joined to a resistor across said DC input, fifth and sixth transistors connected to each transistor of said collector coupled pair, the emitter of said fifth and sixth transistor being connected to the bases of said third and fourth, the collectors of said fifth and sixth transistors being connected to the emitter of said third and fourth transistors, and coupling diodes connected between the bases of said fifth and sixth transistors and the junctions of said Zener diode and its resistor.

12. A circuit as claimed in claim 1 including a pair of emitter coupled and a pair of collector coupled PNP transistors in a bridge circuit which includes said at least two transistors acting as power transistors, the collectors of the emitter coupled pair being joined to the emitters of the collector coupled pair, and output transformer between the collectors of one of the emitter coupled pair and the emitter of one of the collector coupled pair, the positive DC input going to said emitter coupled pair, the negative DC going to said collector coupled pair, a capacitor in parallel across the input, said constant reference voltage means including a Zener diode joined to a resistor in parallel across the input, coupling diodes connected to the bases of said two collector coupled pair, an NPN transistor having its base joined to said Zener diode and resistor junction, its collector being connected to the positive DC and its emitter being connected to said collector coupled pair.

13. A circuit as claimed in claim 1 including two collector coupled and two emitter coupled NPN transistors which includes said at least two transistors acting as power transistors, the emitters of the collector coupled transistors being connected to the collectors of the emitter coupled transistors, a transformer between one of the emitters in said collector coupled pair and one of the collectors in said emitter coupled pair, the positive DC being fed said collector coupled pair, the negative DC being fed said emitter coupled pair, a capacitor in parallel with the source, said constant reference voltage means including a Zener diode joined to a resistor in parallel with the source, coupling diodes coupled to the bases of said two collectors coupled transistors, said saturable voltage absorbing means also including a PNP transistor, its base joined to said Zener diode and resistor junction, its collector connected to the negative DC input and its emitter being connected to said two collectors coupled transistors.

14. A circuit as claimed in claim 1 including a pair of collector coupled NPN transistors, a pair of collector coupled PNP transistors, which includes said at least two transistors acting as power transistors, the emitter of the NPN and PNP transistors being connected, four coupling diodes each connected to a base of one of said transistors, a transformer and load connectors to one of said PNP emitters, and said constant reference voltage means including a Zener diode connected to said four coupling diodes.

15. A circuit as claimed in claim 14 said transformer being center-tapped, said constant reference voltage means including two Zener diodes joined in series, the center tap being connected to said junction of said two Zener diodes.

16. A circuit as claimed in claim 1 including a pair of emitter coupled and a pair of collector coupled PNP transistors which includes said at least two transistors acting as power transistors, the collectors of the emitter coupled pair being joined to the emitters of the collector coupled pair, the positive DC going to the emitter coupled pair, the negative DC going to the collector coupled pair, drive NPN transistors for each, PNP transistors in the emitter coupled pair, the emitter of the NPN transistor being coupled to the emitters of the respective PNP transistors, the collector of the NPN transistor being connected to the base of the respective PNP transistor, a driver PNP transistor for each PNP transistor in the collector coupled pair, the driver emitter being connected to the base of the driven transistor, four coupling diodes each connected to the base of an NPN transistor and to the base of one of the two PNP driver transistors, said constant reference voltage means including a Zener diode connected to said four coupling diodes, and a transformer between the collectors of said emitter coupled pair and the emitters of said collector coupled pair.

References Cited

UNITED STATES PATENTS

| | | | |
|---|---|---|---|
| 2,972,710 | 2/1961 | D'Amico | 317—148.5 |
| 3,061,769 | 10/1962 | Smyth | 321—16 |
| 3,206,695 | 9/1965 | Bennett | 323—22 X |
| 3,237,125 | 2/1966 | Budd | 321—44 X |
| 3,264,570 | 8/1966 | Temple | 331—113 X |

JOHN F. COUCH, *Primary Examiner.*

W. M. SHOOP, *Assistant Examiner*